United States Patent
Park et al.

(10) Patent No.: US 7,177,621 B2
(45) Date of Patent: Feb. 13, 2007

(54) WIRELESS COMMUNICATION MEDIUM AND METHOD FOR OPERATING THE SAME

(75) Inventors: Ji-man Park, Daejeon (KR); Yong-sung Jeon, Daejeon (KR); Hong-il Ju, Daejeon (KR); Young-soo Park, Daejeon (KR); Sung-ik Jun, Daejeon (KR); Kyo-il Chung, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 502 days.

(21) Appl. No.: 10/334,355

(22) Filed: Dec. 31, 2002

(65) Prior Publication Data

US 2004/0072552 A1 Apr. 15, 2004

(30) Foreign Application Priority Data

Oct. 11, 2002 (KR) ............................... 2002-62075

(51) Int. Cl.
*H04B 1/16* (2006.01)

(52) U.S. Cl. ................. 455/337; 455/115.4; 455/226.4
(58) Field of Classification Search ................ 455/85, 455/91, 115, 130, 302, 334, 226.1, 226.4, 455/313, 337, 115.1–4

See application file for complete search history.

(56) References Cited

U.S. PATENT DOCUMENTS

| 5,212,373 | A | | 5/1993 | Fujioka et al. |
| 5,530,920 | A | * | 6/1996 | Takeda ........................ 455/102 |
| 2002/0098821 | A1 | * | 7/2002 | Struhsaker .................. 455/305 |
| 2002/0099538 | A1 | * | 7/2002 | Saito ........................... 704/205 |
| 2003/0157902 | A1 | * | 8/2003 | Khorram ...................... 455/85 |
| 2003/0202619 | A1 | * | 10/2003 | Ibrahim et al. ............. 375/319 |

* cited by examiner

*Primary Examiner*—Edward F. Urban
*Assistant Examiner*—Nhan T. Le
(74) *Attorney, Agent, or Firm*—Blakely Sokoloff Taylor & Zafman

(57) ABSTRACT

A wireless communication medium includes an antenna, an analog signal processor, a digital signal processor, and a central processing unit & logic module. The antenna transmits and receives a signal to and from an external apparatus. The analog signal processor converts an analog signal to a digital signal, and converts a digital signal to an analog signal. The digital signal processor demodulates the digital signal, detects the start and end of data, and generates a first control signal for determining whether data is transmitted to the external apparatus and a second control signal for perceiving the end of data, blocking the reception of data, modulating data, and determining whether modulated data is transmitted to the external apparatus. The central processing unit & logic module processes data received from and transmitted to the external apparatus. Accordingly, an efficiency of processing a RF signal can be improved.

13 Claims, 15 Drawing Sheets

FIG. 3B
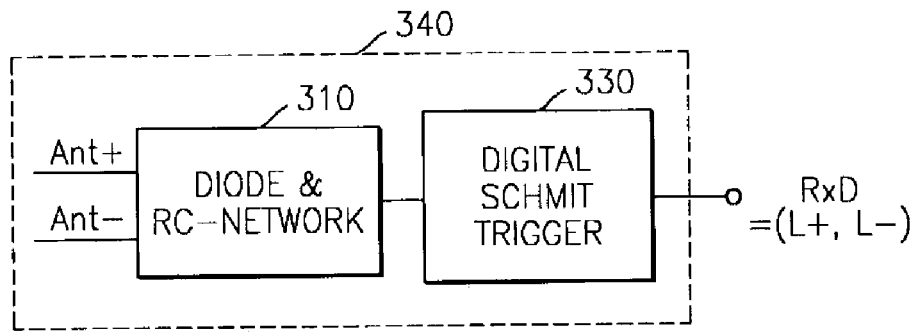
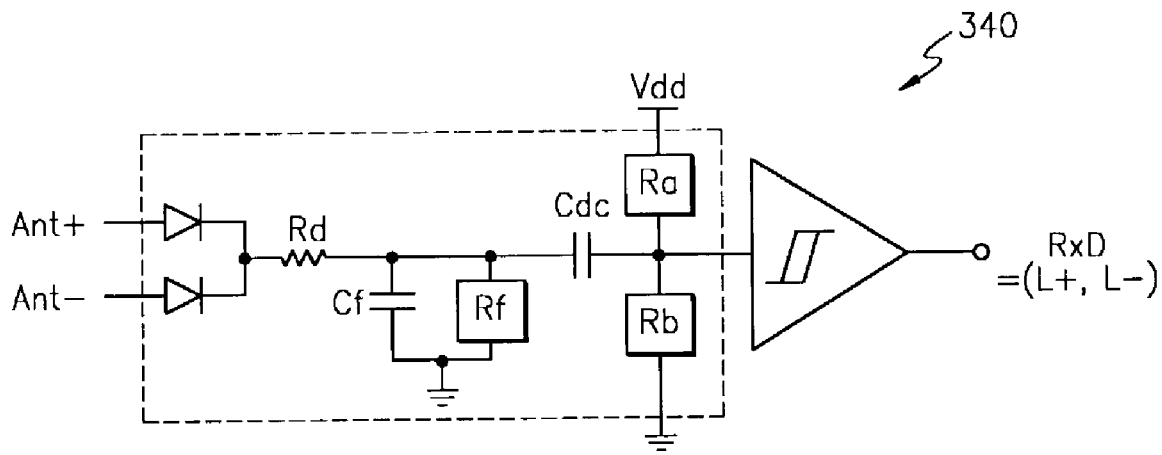
FIG. 3C
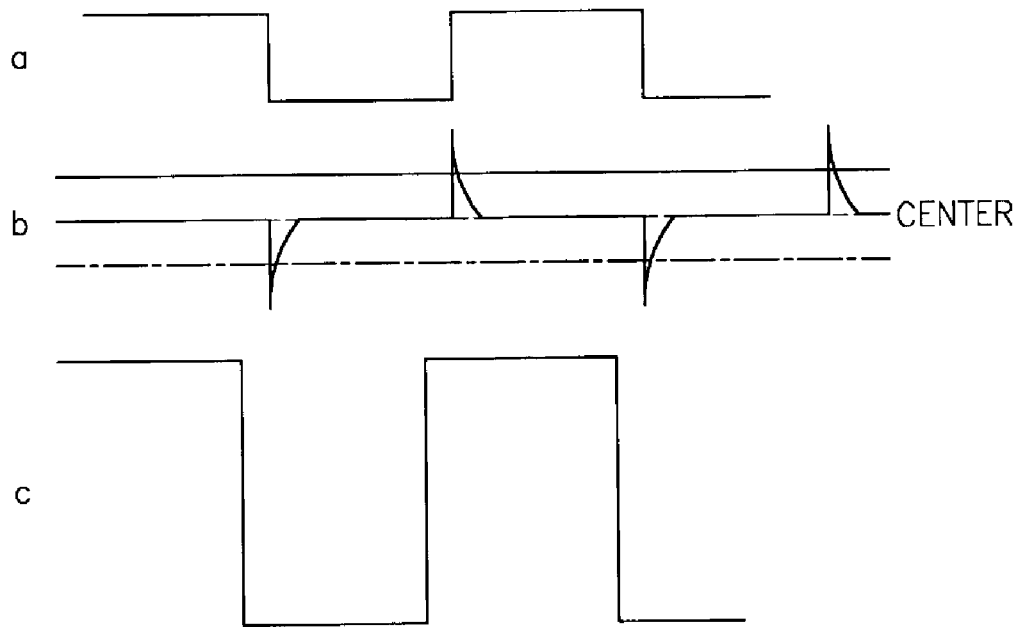

WIRELESS COMMUNICATION MEDIUM AND METHOD FOR OPERATING THE SAME

BACKGROUND OF THE INVENTION

This application claims the priority of Korean Patent Application No. 2002-62075 filed on Oct. 11, 2002 in the Korean Intellectual Property Office, the disclosure of which is incorporated herein in its entirety by reference.

1. Field of the Invention

The present invention relates to a wireless communication medium which can sense and generate a radio frequency (RF) signal necessary for communicating with a card reader or a contactless communication system, processes an analog signal to generate power necessary for driving a radio frequency identification (RFID) system, and processes a digital signal between an analog signal processor and a central processing unit (CPU) based on a communication protocol specified in ISO 14443, and a method for operating the same.

2. Description of the Related Art

In a method of processing an analog signal of a conventional RFID system, a RF hardware signal processor is broken down by a high voltage from an antenna, and thus the conventional RFID system loses its functions. Thus, the conventional RFID system cannot be used as a contactless RFID system. Also, a circuit is complicated and a large device value is required in order to prevent the contactless RFID from losing its functions.

In the conventional RFID, only a circuit, which processes an analog signal, is constituted and connected to a CPU. In other words, the CPU carries out functions of a digital signal processor without the digital signal processor or a digital signal processor carries out limited functions. Thus, it takes much time for the CPU to process such a digital signal and the whole performance of the conventional RFID deteriorates.

In addition, the conventional RFID uses a circuit which modulates a signal being transmitted to generate a BPSK-modulated signal by applying a carrier frequency of 874 KHz to a flip-flop circuit. Here, glitch necessarily occurs in the BPSK-modulated signal.

SUMMARY OF THE INVENTION

Accordingly, the present invention provides a RFID system which generates signals for controlling the operation of the RFID system by an additional logic circuit so that the additional logic circuit along with a CPU reliably and rapidly performs a process of converting an analog signal to a digital signal, and a method for operating the RFID system.

According to an aspect of the invention, there is provided a wireless communication medium including an antenna, an analog signal processor, a digital signal processor, and a central processing unit & logic module. The antenna transmits and receives a signal to and from an external apparatus. The analog signal processor converts an analog signal received via the antenna to a digital signal, and converts a digital signal to be transmitted to the external apparatus to an analog signal and transmits the analog signal to the antenna. The digital signal processor receives the digital signal from the analog signal processor, demodulates the digital signal, detects data and signals informing the start and end of data, and generates a control signal for determining whether data is transmitted to the external apparatus and a control signal for perceiving the end of data, blocking the reception of data from the external apparatus after a predetermined period of time, modulating data, and determining whether modulated data is transmitted to the external apparatus. The central processing unit & logic module includes a storage device and logic circuits that process data received from and transmitted to the external apparatus.

According to another aspect of the present invention, there is provided a method of operating a wireless communication medium. An analog signal received from an external apparatus is converted to a digital signal and a digital signal to be transmitted to the external apparatus is converted to an analog signal. Modulation and demodulation is performed for the transmission and reception of data to and from the external apparatus and signals for controlling the operation of the wireless communication medium are generated based on transmitted and received data. Transmitted and received data is processed.

BRIEF DESCRIPTION OF THE DRAWINGS

The above features and advantages of the present invention will become more apparent by describing in detail exemplary embodiments thereof with reference to the attached drawings in which:

FIG. 3B is a block diagram of another embodiment of the demodulator of the analog signal processor shown in FIG. 1;

FIG. 3C is a view illustrating waveforms of signals of the demodulator;

DETAILED DESCRIPTION OF THE INVENTION

Hereinafter, preferred embodiments of the present invention will now be described in detail with reference to the attached drawings.

Figure 1:
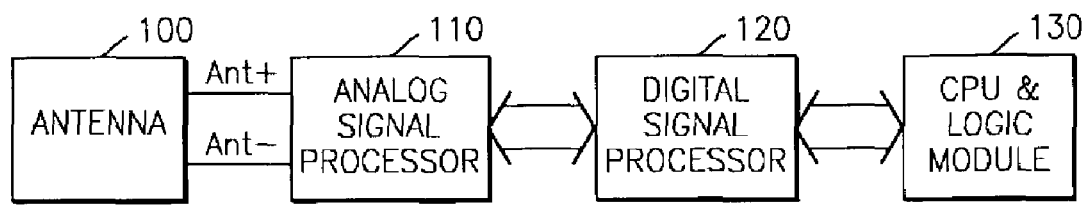
FIG. 1 is a hardware block diagram of a wireless communication medium according to the present invention.
Figure 14:
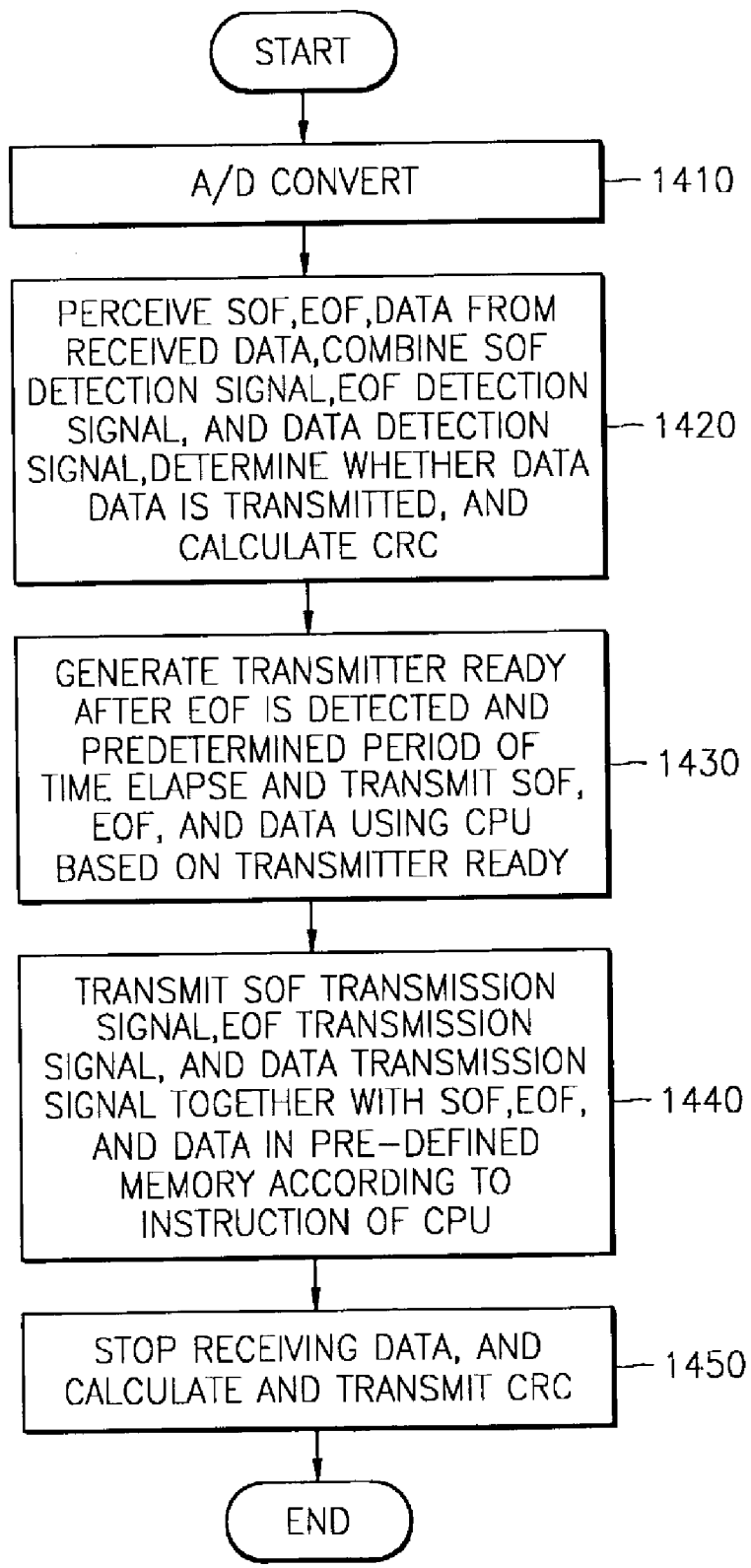
FIG. 14 is a flowchart explaining a method for operating a wireless communication medium according to the present invention.

FIG. 1 is a hardware block diagram of a wireless communication medium according to the present invention, and FIG. 14 is a flowchart explaining a method for operating the wireless communication medium. Hereinafter, the wireless communication medium is referred to as a radio frequency identification (RFID).

Figure 2A:
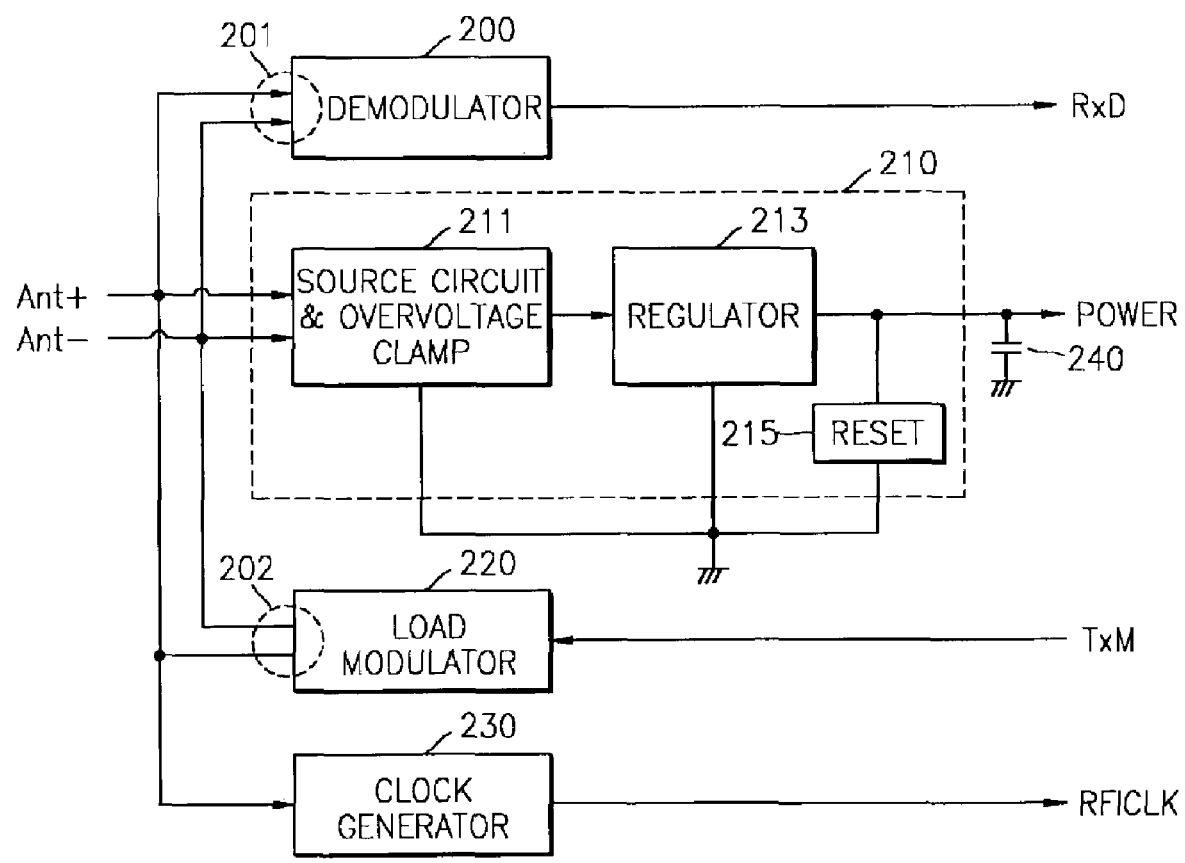
FIG. 2A is a detailed block diagram of an embodiment of an analog signal processor shown in FIG. 1.
Figure 2B:
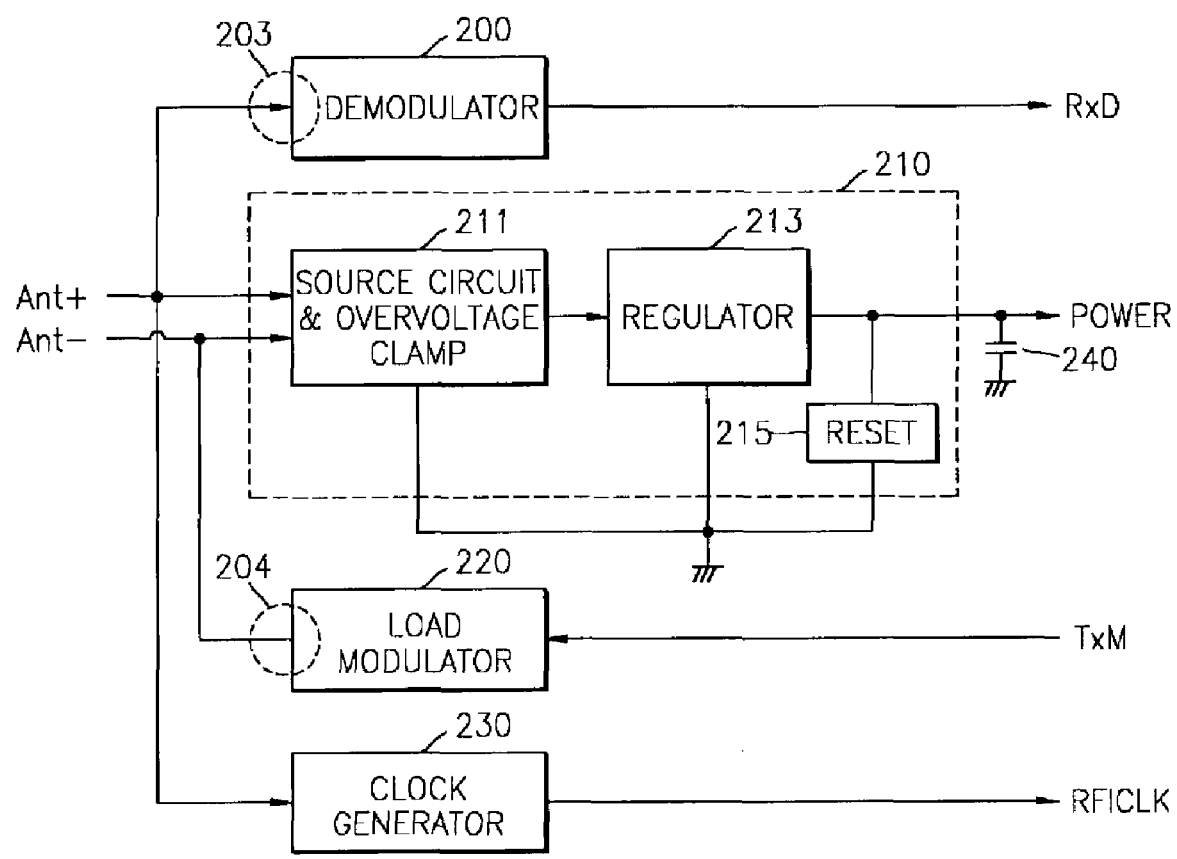
FIG. 2B is a detailed block diagram of another embodiment of the analog signal processor shown in FIG. 1.
Figure 3A:
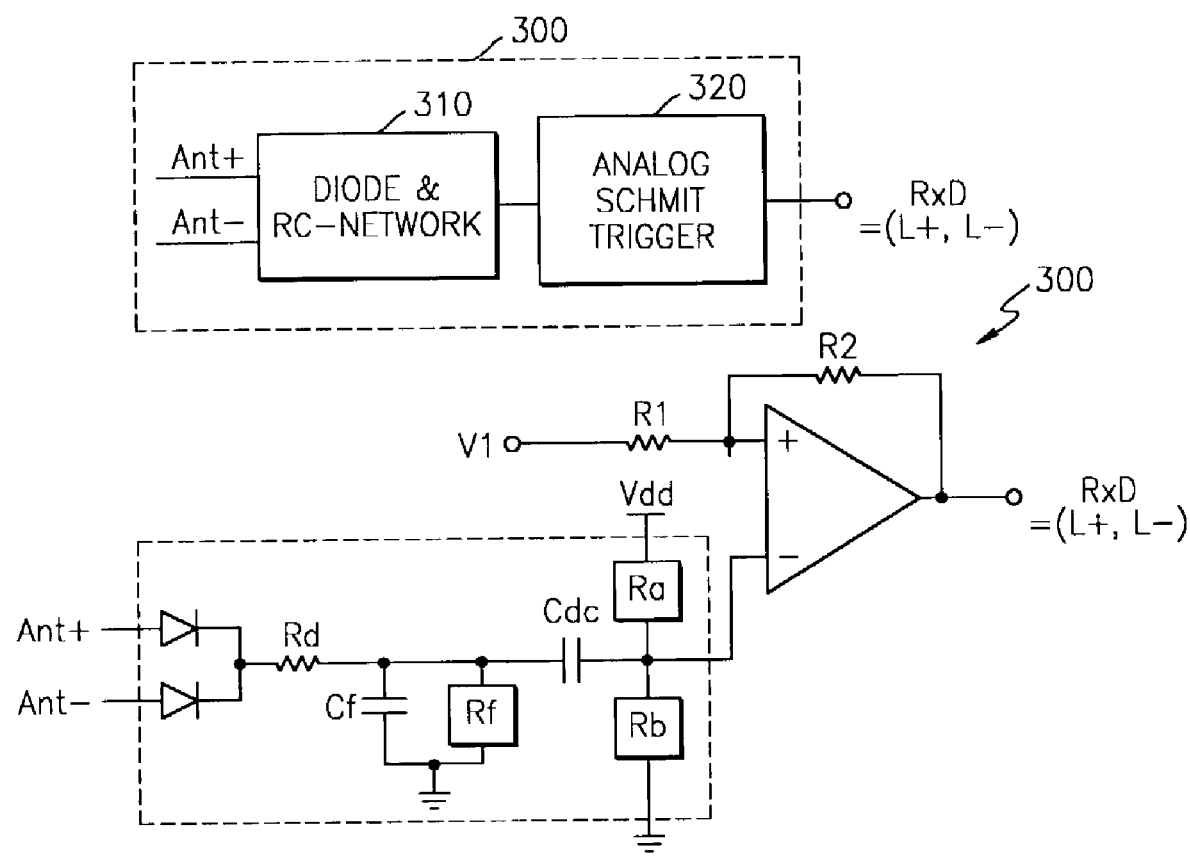
FIG. 3A is a block diagram of an embodiment of a demodulator of the analog signal processor shown in FIG. 1.

The functions of basic components of a RFID according to the present invention will be described. First, an antenna 100 serves to transmit and receive data to and from an external apparatus (e.g., a card reader), which communicates with the RFID, using an RF signal. The antenna 100 receives the RF signal from the external apparatus and transmits the RF signal to an analog signal processor 110, which is connected to two nodes Ant+ and Ant− of the antenna 100. Detailed blocks and functions of the analog signal processor 110 will be described with reference to FIGS. 2A and 2B. FIGS. 2A and 2B respectively illustrate different embodiments of the analog signal processor 110 shown in FIG. 1. The analog signal processor 110 includes a demodulator 200, a power supply 210, a load modulator 220, a clock generator 230, and a capacitor 240. The basic block of FIG. 2B is identical to the basic block of FIG. 2A while the connection of two nodes Ant+ and Ant− of FIG. 2B is different form the connection of two nodes Ant+ and Ant− of FIG. 2A. In other words, the antenna 100 may be constituted so that one node Ant+ is connected to the demodulator 200 to receive data while the other node Ant− is connected to the load modulator 220 to transmit data. The function of each block will be described. The demodulator 200 demodulates a data signal input via the antenna 100. In FIG. 3A, a demodulator 300 includes a diode & register-capacitor (RC)-network 310 and an analog schmit trigger 330. In FIG. 3B, the demodulator 300 includes the diode & RC-network 310 and a digital schmit trigger 330. FIG. 3C shows waveforms of signals of the demodulator 300 having the above-described structure. Referring to FIG. 3C, a carrier signal and a data signal input via the antenna 100 are modulated to low level pulse waves marked with a of FIG. 3C, passing through the diode & RC-network 310. The low level pulse waves are modulated to a peak signal (b of FIG. 3C) in the differential form by loads Ra and Rb and a capacitor Cdc which are composed of passive resistances or MOS devices. The analog schmit trigger 320 or the digital schmit trigger 330 demodulates this peak signal to a digital signal RxD (c of FIG. 3C). Dotted lines of FIGS. 3A and 3B represent that the demodulator 300 may be operated as an amplitude shift keying (ASK) demodulator although the node Ant− is not connected to the diode & RC-network 310, i.e., the diode & RC-network 310 is removed.

Figure 6:
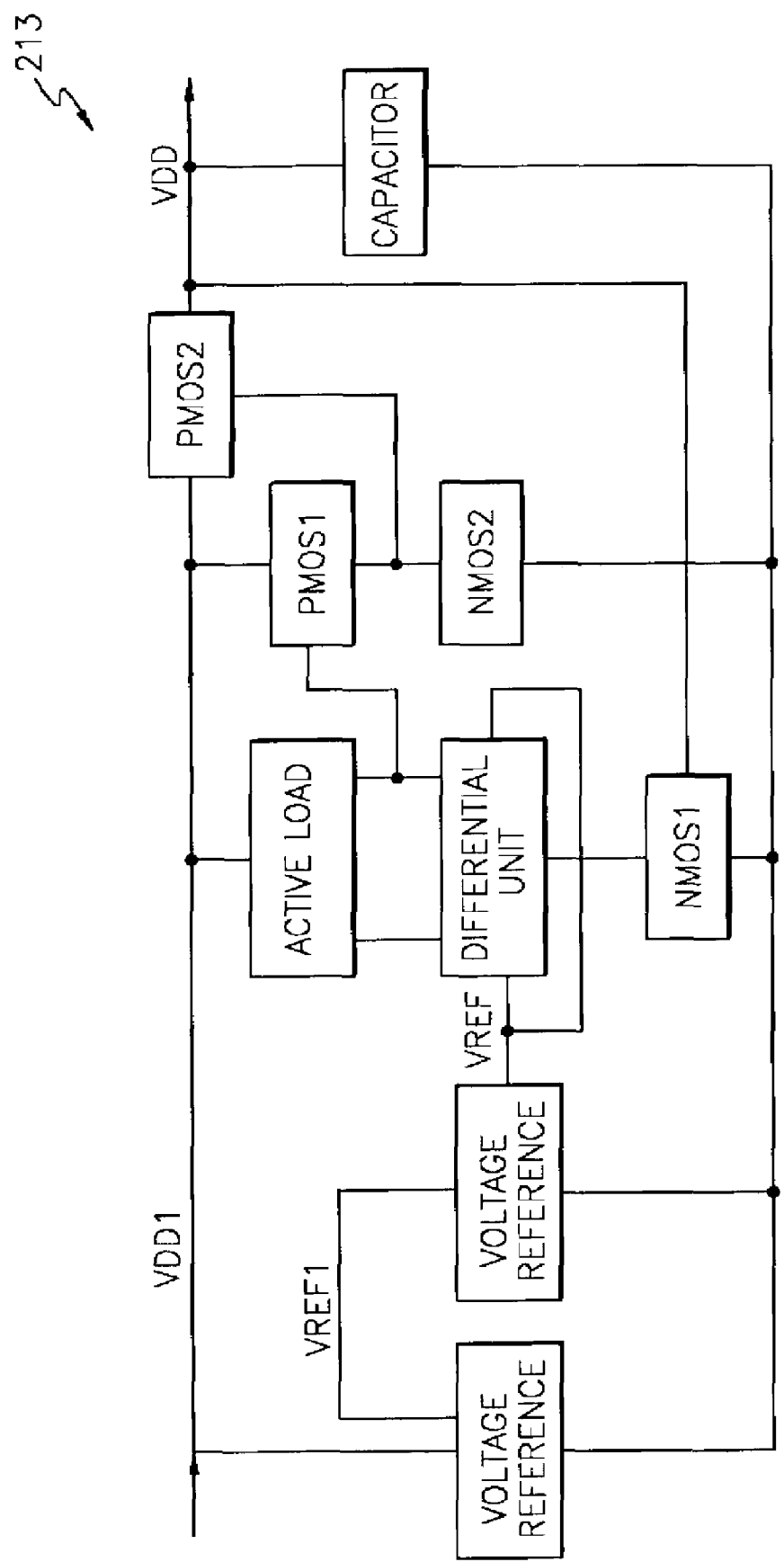
FIG. 6 is a detailed block diagram of a regulator of the analog signal processor shown in FIG. 1.

Next, the power supply 210 will be described. The power supply 210 serves to output power necessary for the RFID from an alternating signal induced via the antenna 100. The power supply 210 includes a source circuit & overvoltage clamp 211, a regulator 213, and a reset 215. The source circuit & overvoltage clamp 211 is a smoothing circuit which is basically composed of PMOS or NMOS transistors. The source circuit & overvoltage clamp 211 extracts a direct signal from the alternating signal and prevents an overvoltage exceeding a predetermined reference value from being output. The regulator 213 regulates an irregular direct voltage generated by the source circuit & overvoltage clamp 211. The regulator 213 is composed of a dual reference voltage block and a differential unit. FIG. 6 is a block diagram of the regulator 213. The regulator 213 has a structure in which gates of the differential unit are connected to each other, a reference voltage is simultaneously input to the gates, and a gate of an NMOS 1 is connected to a power supply voltage VDD. Thus, the regulator 213 has better characteristics than a conventional direct regulator. The reset 215 initializes all circuits of the RFID when power is supplied.

Figure 4A:
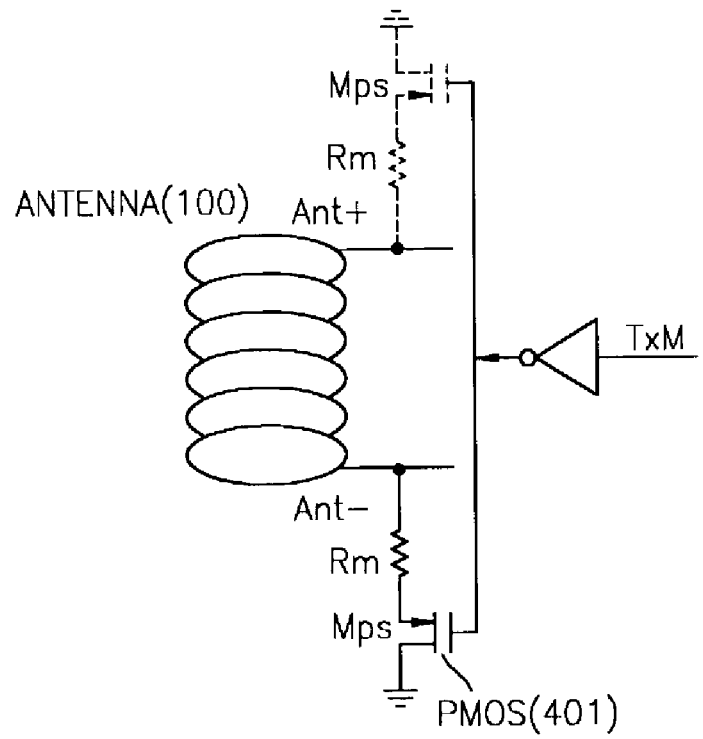
FIG. 4A is a view illustrating an embodiment of a load modulator of the analog signal processor shown in FIG. 1.
Figure 4B:
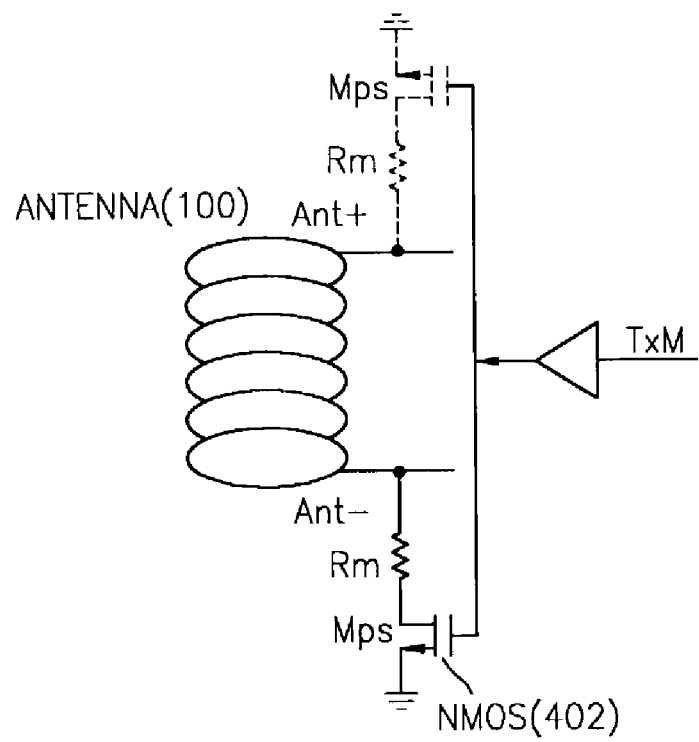
FIG. 4B is a view illustrating another embodiment of the load modulator of the analog signal processor shown in FIG. 1.

The load modulator 220 will be described. FIGS. 4A and 4B illustrate embodiments of the load modulator 220. The load modulator 220 shown in FIG. 4A is a switch circuit having a PMOS transistor 401. The load modulator 220 switches a BPSK-modulated data signal to transmit the data signal to an external apparatus. When a voltage of the switched signal is logic "low", the load modulator 220 is turned on. When the voltage of the switched signal is logic "high", the load modulator 220 is turned off. Here, a channel width of the PMOS transistor 401 can be reduced compared to an NMOS transistor. Alternatively, in this embodiment, the RFID may communicate with an external apparatus by connecting a node of a load modulator to a node Ant− of the antenna 100. The load modulator 220 shown in FIG. 4B is a switch circuit having an NMOS transistor. The load modulator 220 switches a BPSK-modulated data signal to transmit the data signal to an external apparatus. When a voltage of the switched signal is logic "high", the load modulator 220 is turned on. When the voltage of the switched signal is logic "low", the load modulator 220 is turned off. Even in this embodiment, the RFID may communicate with an external apparatus by connecting a node of a load modulator to the node Ant− of the antenna 100.

Figure 5A:
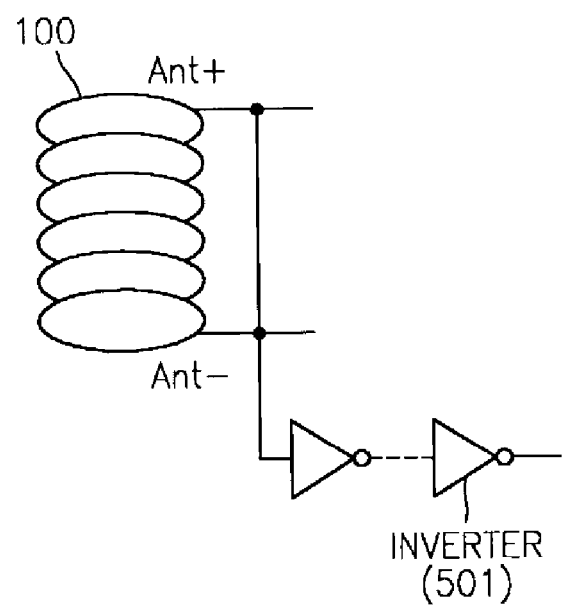
FIG. 5A is a view illustrating an embodiment of a clock generator of the analog signal processor shown in FIG. 1.
Figure 5B:
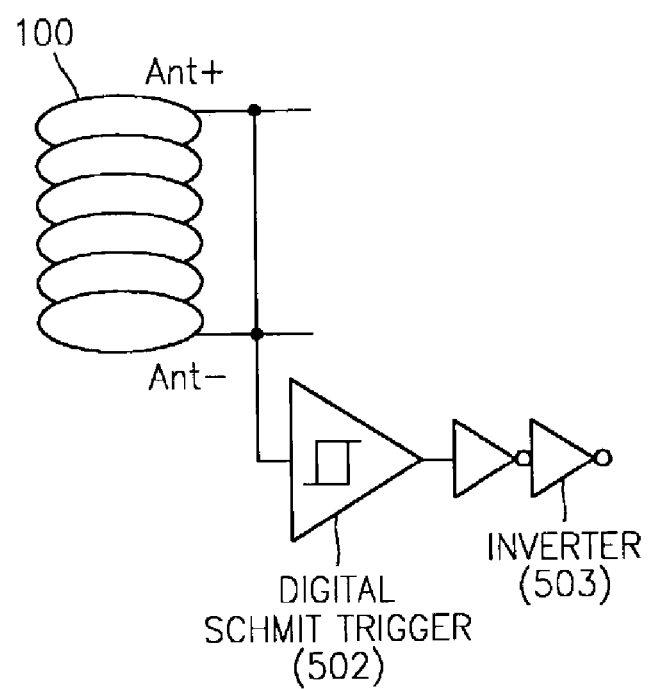
FIG. 5B is a view illustrating another embodiment of the clock generator of the analog signal processor shown in FIG. 1.

The clock generator 230 will be described. FIGS. 5A and 5B illustrate embodiments of the clock generator 230. An input of the clock generator 230 is directly connected to the node Ant+ of the antenna 100. The clock generator 230 may include only a group of inverters 501 or may include a digital schmit trigger 502 and a group of inverters 503. An output frequency of the clock generator 230 follows a carrier frequency of an external apparatus but is not a duty cycle having a pulse width of 50%. Thus, this output frequency can be 2-, 4-, 8-, or 16-divided by a clock divider 720 to be used as a clock frequency in the digital signal processor 120 (step 1410).

The capacitor 240 does not affect the physical shape of the RFID in the manufacture of the RFID. The capacitor 240 can be used to supply a stable direct current to the CPU and logic elements which require a large amount of power. The capacitor 240 is connected between a power supply and ground when manufacturing cards or Capacitor Over Bit-lines (COBs) of chips.

Figure 7:
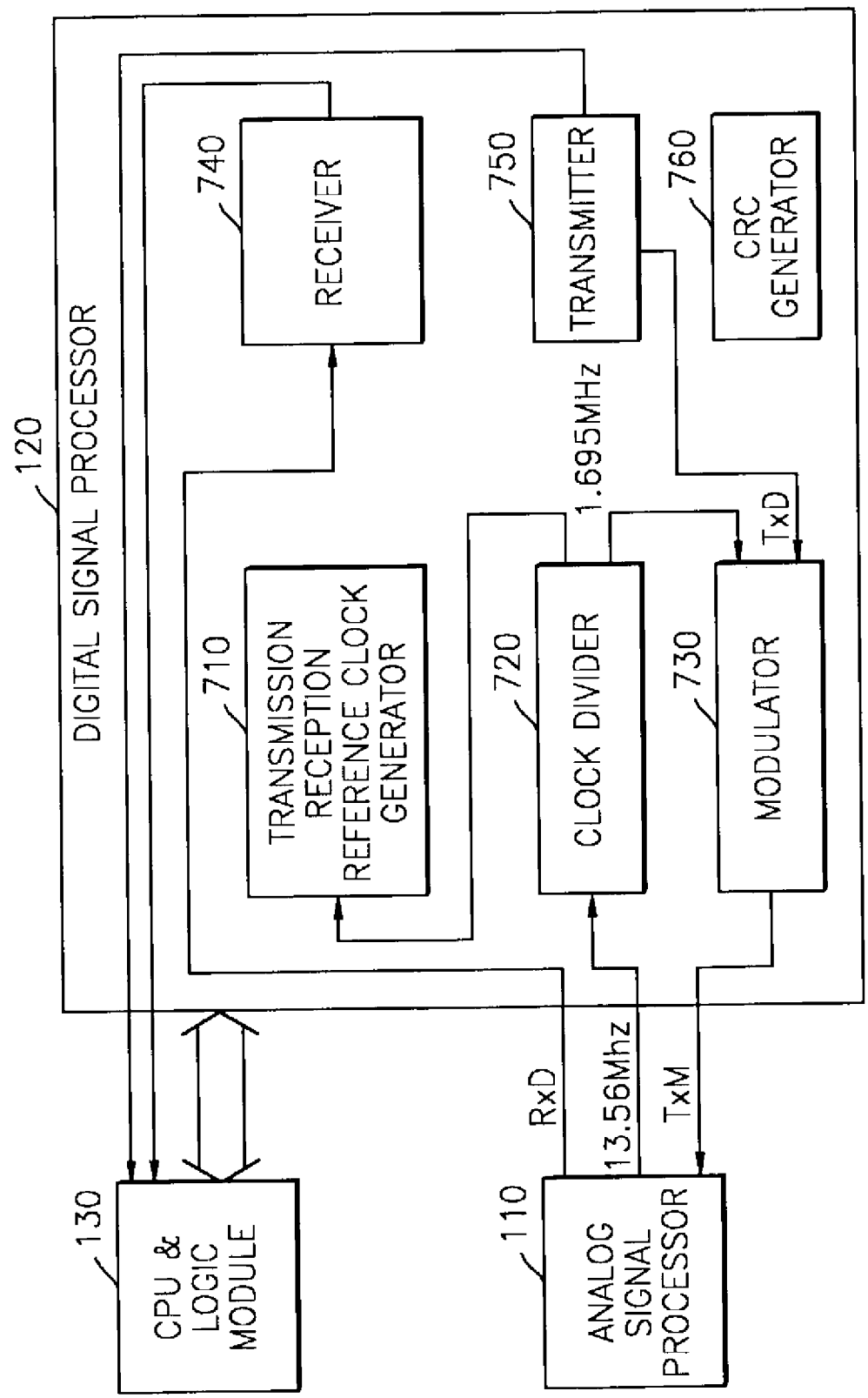
FIG. 7 is a detailed block diagram of a digital signal processor shown in FIG. 1.
Figure 8:
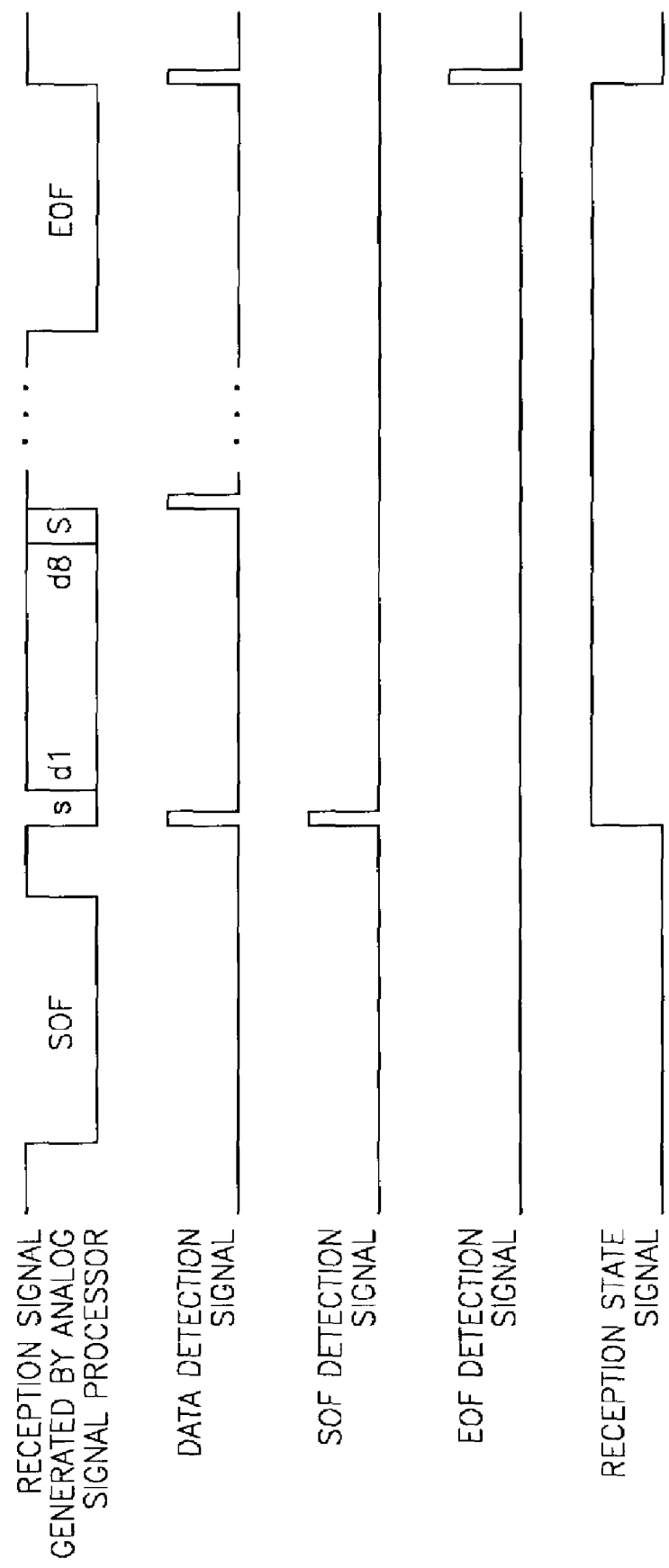
FIG. 8 is a view illustrating signals input to and output from a receiver shown in FIG. 7.
Figure 9:
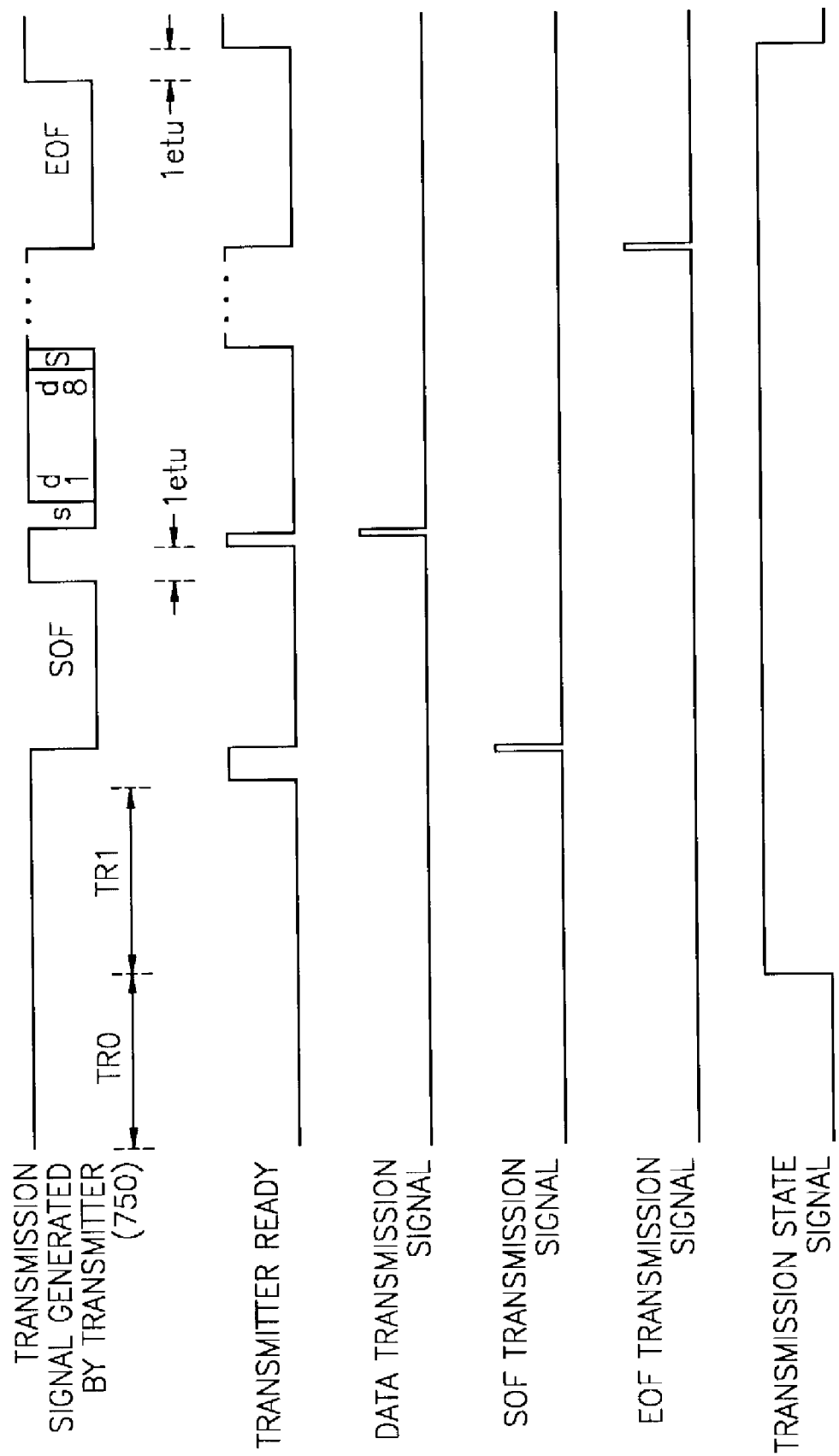
FIG. 9 is a view illustrating signals input to and output from a transmitter shown in FIG. 7.

The digital signal processor 120 will be described. FIG. 7 is a block diagram of the digital signal processor 120, and FIGS. 8 and 9 respectively illustrate signals input to and output from a receiver 740 and a transmitter 750 and internal state signals.

The clock divider 720 receives clock signals of 13.56 MHz from the analog signal processor 110 and generates a 2-divided clock signal of 6.78 MHz, a 4-divided clock signal of 3.39 MHz, or an 8-divided clock signal of 1.695 MHz. Next, the clock divider 720 selects one of the divided clock signals by software and outputs the selected clock signal to the transmission and reception reference clock generator 710. The clock divider 720 inputs the 8-divided clock signal of 1.695 MHz to the modulator 730 so that a signal is BPSK-modulated using the 8-divided clock signal and is transmitted to an external apparatus.

The receiver 740 samples received signals from the analog signal processor 110 whenever a reception reference clock signal generated by the transmission reception reference clock generator 710 is logic "high". The receiver 740 stores one of eight time samplings as a data value. Next, the receiver 740 perceives a start of frame (SOF) signal informing the start of a frame in a received signal, generates a SOF detection signal (shown in FIG. 8) informing the SOF, and stores the SOF detection signal in an internal register so that the SOF signal is perceived in software. The receiver 740 perceives an end of frame (EOF) signal informing the end of a frame in the received signal, generates an EOF detection signal (shown in FIG. 8) informing the EOF, and stores the EOF detection signal in the internal register so that the EOF signal is perceived in software. The receiver 740 generates a reception state signal which maintains a logic "high" state between the SOF signal and EOF signal of the received signal. When the reception state signal is logic "high", the transmitter 750 stops operating and the CRC generator 760 operates.

The transmitter 750 receives the SOF signal and the EOF signal from the receiver 740 and generates a transmitter ready after TR0 and TR1 specified in ISO 14443 elapse to inform a CPU & logic module 130 of the ready of transmission. When the CPU & logic module 130 receives the transmitter ready, the CPU & logic module 130 gives an instruction for the transmitter 750 to transmit the SOF signal, the EOF signal, or data. The CPU & logic module 130 includes addresses defined for the SOF signal and the EOF signal. Thus, when the CPU & logic module 130 transmits the defined addresses of the SOF signal and the EOF signal to the transmitter 750, the transmitter 750 transmits one of the SOF signal and the EOF signal corresponding to the address defined by the CPU & logic module 130. When the CPU & logic module 130 transmits an address defined for data with a desired data value to the transmitter 750, the transmitter 750 converts data to a serial signal and transmits the serial signal to the modulator 730. Whenever the transmission reference clock signal generated by the transmission reception reference clock generator 710 is logic "high", the transmitter 750 converts the SOF signal, the EOF signal, or data to a serial transmission signal and transmits the serial transmission signal by each 1 etu to the modulator 730 according to the instruction from the CPU & logic module 130. The transmitter 750 generates a SOF transmission signal (shown in FIG. 9), an EOF transmission signal (shown in FIG. 9), and a data transmission signal (shown in FIG. 9) which each inform of being transmitted the SOF signal, the EOF signal, and data. The transmitter 750 generates a transmission state signal which becomes logic "high" after the receiver 740 generates the EOF signal and TR0 specified in ISO 1443 passes while becomes logic "low" after the transmission of the EOF transmission signal is ended. When the transmission state signal is logic "high", the receiver 740 stops operating, and the CRC generator 760 and the modulator 730 operate (steps 1420 and 1430).

Figure 10:
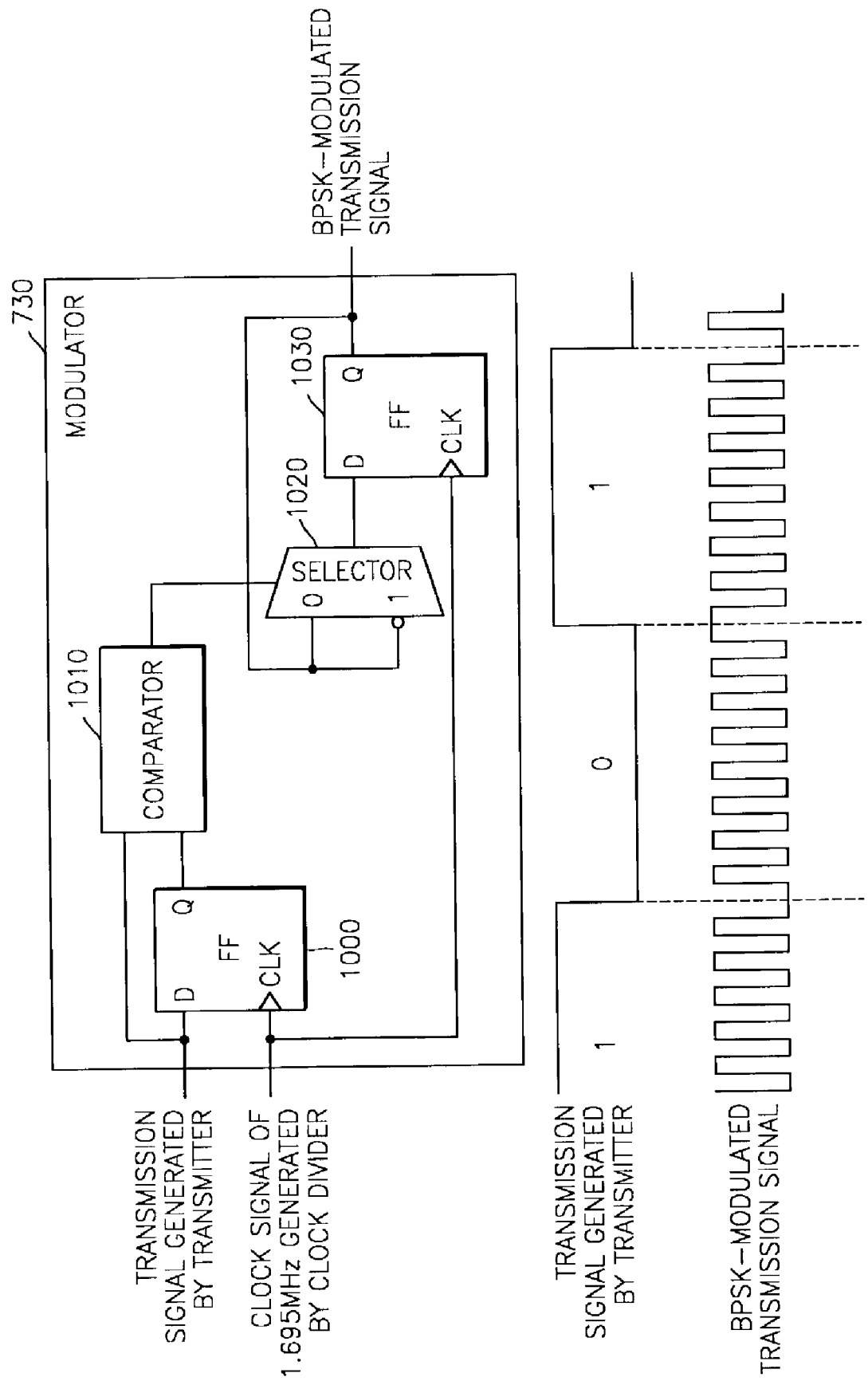
FIG. 10 is a view illustrating a modulator shown in FIG. 7 and signals input to and output from the modulator.

The modulator 730 will be described. FIG. 10 shows an embodiment of the modulator 730 and signals input to and output from the modulator 730. Referring to FIG. 10, the modulator 730 BPSK-modulates the transmission signal generated by the transmitter 750 using the clock signal of 1.695 MHz generated by the clock divider 720. When the clock signal of 1.695 MHz becomes logic "high", a flip-flop 1000 samples the transmission signal generated by the transmitter 750 and retains the sampled transmission signal until the clock signal of 1.695 MHz becomes logic "high" again. When the flip-flop 1000 inputs the transmission signal to a comparator 1010, the comparator 1010 compares the sampled value retained in the flip-flop 1000 with a transmission signal value currently generated by the transmitter 750. If the value retained in the flip-flop 1000 is equal to the transmission signal value, a value of a flip-flop 1030 is inverted. If not, the value of the flip-flop 103 is maintained. In the above-described logic circuit, since the clock signal of 1.695 MHz is 2-divided in a section in which the transmission signal generated by the transmitter 750 does not change, a value output from the modulator 730 is equal to the clock signal of 847 KHz. However, since the clock signal of 1.695 MHz is not 2-divided in a section in which the transmission signal generated by the transmitter 750 changes, the modulator 730 generates a phase-shifted signal. The transmission signal BPSK-modulated according to the above-described method is transmitted to the external apparatus via the analog signal processor 110 and the antenna 100. Here, since glitch does not occur in the transmission signal at all, the performance of the RFID does not deteriorate an error does not occur in a signal the external apparatus receives.

Figure 11:
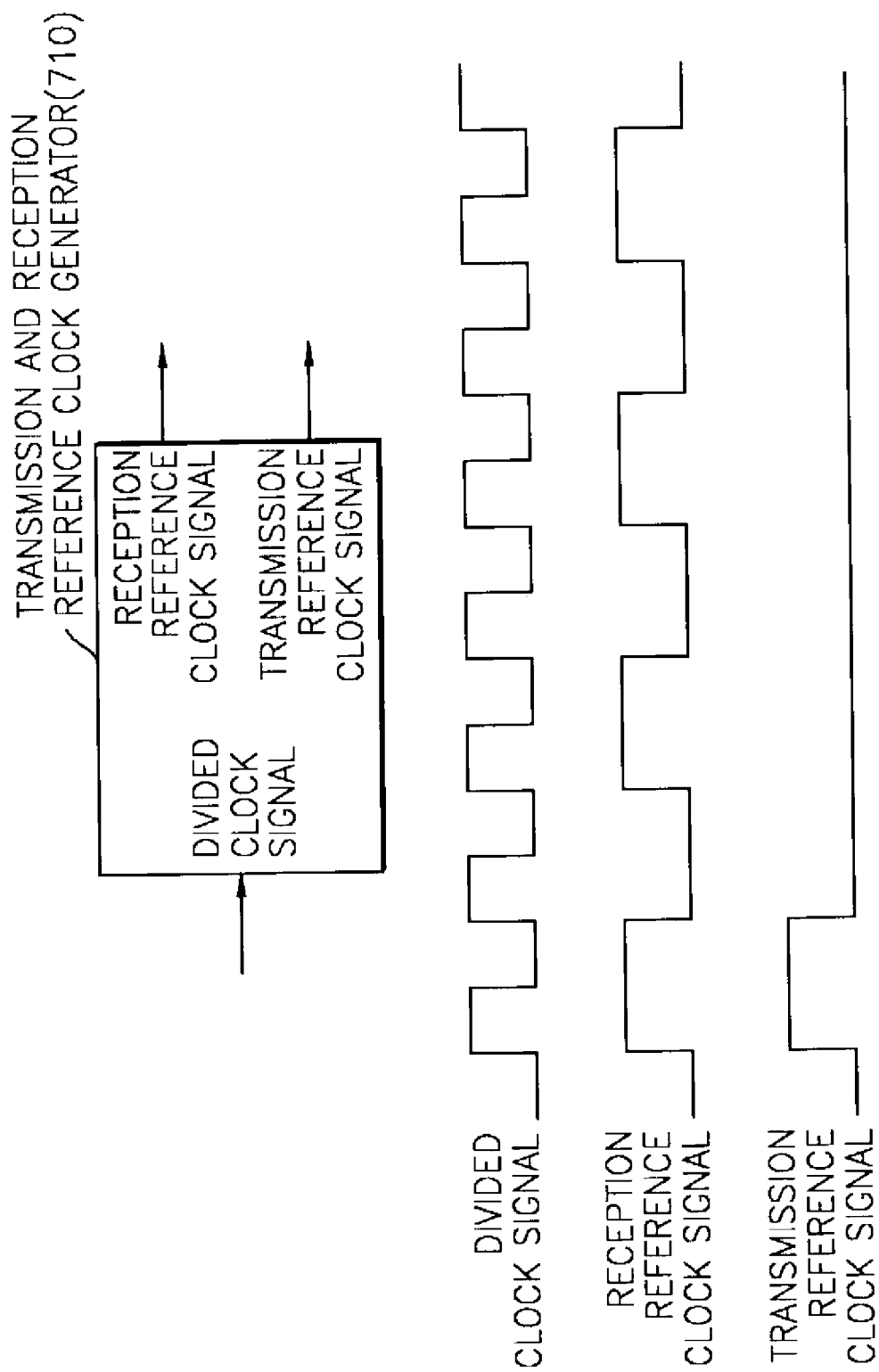
FIG. 11 is a view illustrating signals input to and output form a transmission and reception reference clock generator shown in FIG. 7.

The transmission reception reference clock generator 710 will be described with reference to FIG. 11. The transmission reception reference clock generator 710 generates a reference clock signal necessary for the transmission and reception of data using a divided clock signal generated by the clock divider 720. The transmission reception reference clock generator 710 generates a transmission reference clock signal and a reception reference clock signal and transmits the transmission reference clock signal and the reception reference clock signal to the transmitter 750 and the receiver 740, respectively. If the divided clock signal is 1.695 MHz, the reception reference clock signal is a clock signal having a frequency of 847 KHz that is 2-division of the divided clock signal. The transmission reference clock signal is a clock signal which is equal to the reception reference clock signal in a logic "high" section but has a frequency of 106 KHz.

Figure 12:
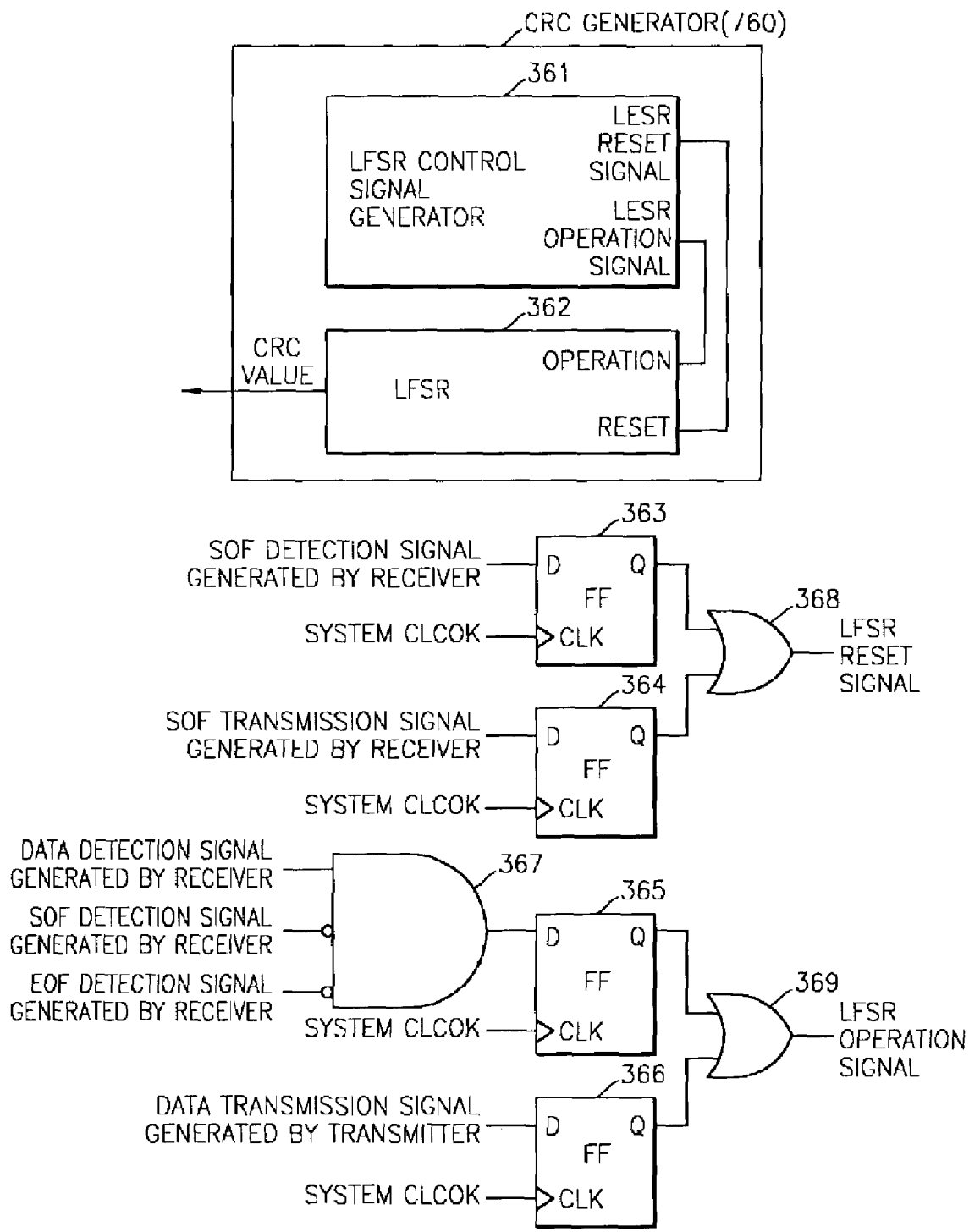
FIG. 12 is a view illustrating an embodiment of a cyclic redundancy check (CRC) generator shown in FIG. 7.

FIG. 12 is a block diagram of the CRC generator 760. The CRC generator 760 includes a linear feedback shift register (LFSR) module 362 and a LFSR control signal generator 361 which calculate a CRC value when transmitting and receiving data to and from an external apparatus. The LFSR control signal generator 361 generates a LFSR reset signal, which initialises a LFSR, and a LFSR operation signal which drives the LFSR, using the reception state signal and the transmission state signal generated by the receiver 740 and the transmitter 750. To generate the LFSR reset signal, the SOF detection signal generated by the receiver 740 is input to a flip-flop 363, the SOF transmission signal generated by the transmitter 750 is input to a flip-flop 364, and an OR operation 368 is performed for values output from the flip-flops 363 and 364. When the LFSR reset signal is logic "high", the CRC value becomes 0x0000 or 0xFFFF. To generate the LFSR operation signal, a value, which is obtained by performing an AND operation 367 for the data detection signal, an inverse value of the SOF detection signal, and an inverse value of the EOF detection signal, is input to a flip-flop 365. Next, the data transmission signal generated by the transmitter 750 is input to a flip-flop 366. Thereafter, an OR operation 369 is performed for values output from the flip-flops 365 and 366. When the LFSR operation signal is logic "high", the CRC value is automatically calculated when transmitting or receiving data (steps 1440 and 1450).

Figure 13:
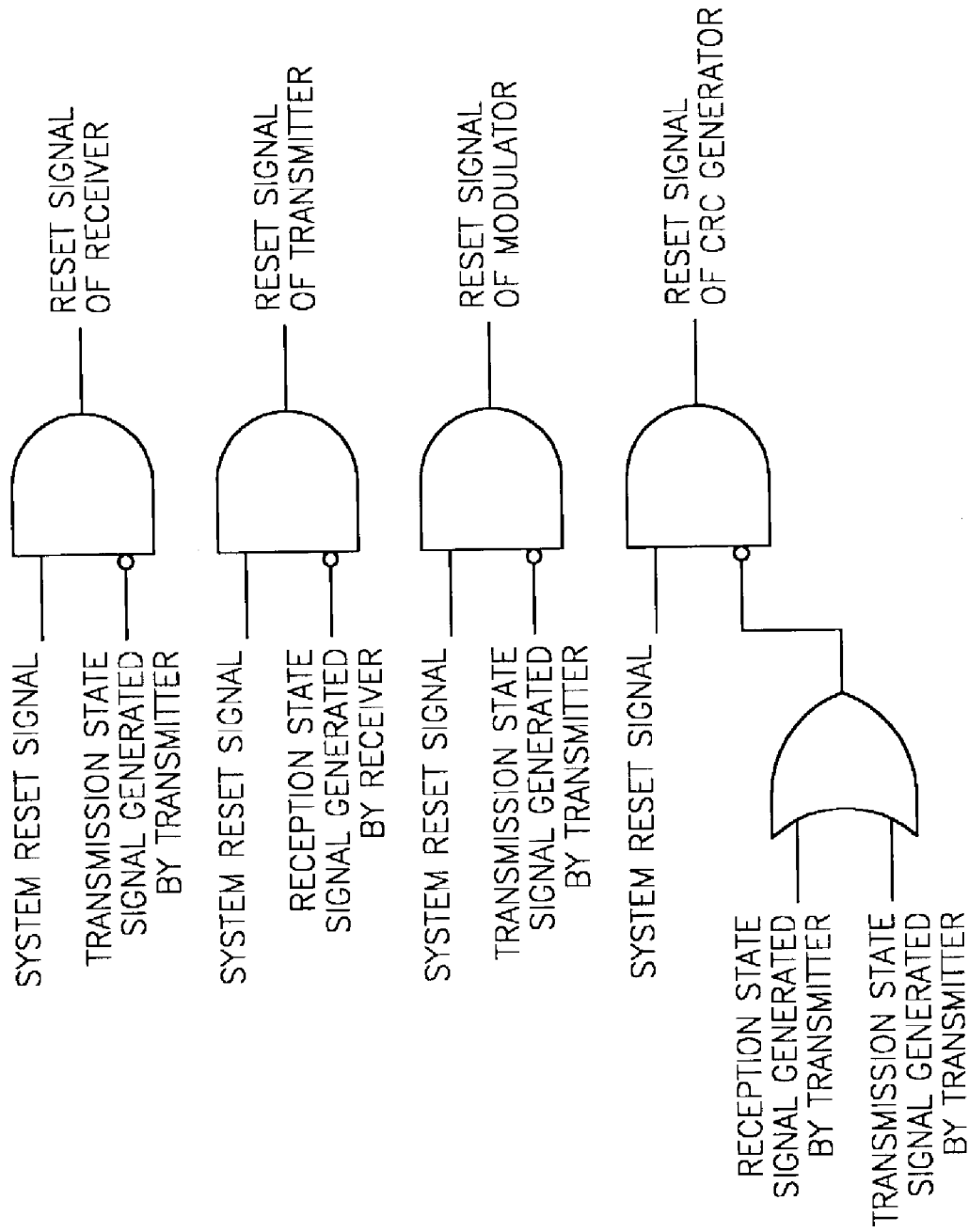
FIG. 13 is a view illustrating reset signal generating circuits to reset modules of the digital signal processor shown in FIG. 7.

FIG. 13 shows combinational logic for generating reset signals of the receiver 740, the transmitter 750, the modulator 730, and the CRC generator 760 of six modules of the digital signal processor 120. While the reception state signal of the receiver 740 is logic "high", the reset signal of the transmitter 750 becomes logic "low" and the transmitter 750 stops operating. While the transmission state signal of the transmitter 750 is logic "high", the reset signals of the receiver 740 and the modulator 730 become logic "low" and thus the receiver 740 and the modulator 730 stop operating. Only when the reception state signal of the receiver 740 is logic "high" or the transmission state signal of the transmitter 750 is logic "high", the reset signal of the CRC generator 730 becomes logic "high" and the CRC generator 730 starts operating.

Accordingly, by operating or stopping four modules under specific conditions, power consumption of the RFID can be lowered. Also, although an unnecessary signal is transmitted to the receiver 740 due to changes in power during the operation of the transmitter 750, since the receiver 740 is reset, the RFID can stably operate.

As described above, in a wireless communication medium and a method for operating the wireless communication medium according to the present invention, circuits are simple and a small amount of power is consumed. Thus, an efficiency of processing a RF signal can be improved. In addition, an analog signal processing hardware module and a digital signal processing hardware module are used in semiconductor IP models, respectively. A RF signal processor of the present invention can be directly applied to an existing information communication terminal (a portable phone, a personal digital assistant (PDA), or the like) by simply changing hardware and programs in the existing information communication terminal. Furthermore, a large amount of power can be stably supplied to a CPU and logic elements block using an external capacitor.

The RFID can include an additional digital signal processor which perceives a serial signal received from the analog signal processor 100, converts the serial signal to data, transmits data to the CPU & logic module 130, converts data transmitted from the CPU & logic module 130 to a serial signal, BPSK-modulates the serial signal, transmits BPSK-modulated signal to the ananlog signal processor 100, and automatically generates a CRC value of data received and transmitted. Thus, the performance of the RFID can be improved and an error occurring when transmitting and receiving data can be reduced.

What is claimed is:

1. A wireless communication medium comprising: an antenna which transmits and receives a signal to and from an external apparatus; an analog signal processor which converts an analog signal received via the antenna to a digital signal, and converts a digital signal to be transmitted to the external apparatus to an analog signal and transmits the analog signal to the antenna; a digital signal processor which receives the digital signal from the analog signal processor, demodulates the digital signal, detects data and signals informing the start and end of data, and generates a first control signal for determining whether data is transmitted to the external apparatus and a second control signal for perceiving the end of data, blocking the reception of data from the external apparatus after a predetermined period of time, modulating data, and determining whether modulated data is transmitted to the external apparatus; and a central processing unit & logic module which includes a storage device and logic circuits that process data received from and transmitted to the external apparatus.

2. The wireless communication medium of claim 1, wherein the analog signal processor comprises: a demodulator which demodulates and outputs the analog signal; a power supply which generates a constant voltage from the analog signal and outputs the constant voltage, blocks an overvoltage, and resets the wireless communication medium; a load modulator which switches modulated data output from the digital signal processor and transmits the modulated data to the antenna so as to forward the modulated signal to the external apparatus; and a clock generator which extracts a clock signal from the analog signal.

3. The wireless communication medium of claim 2, wherein the demodulator differentiates the analog signal and converts the differentiated analog signal to the digital signal.

4. The wireless communication medium of claim 2, wherein the demodulator is connected to at least one of two nodes of the antenna to demodulate the analog signal.

5. The wireless communication medium of claim 2, wherein the load modulator is connected to at least one of the two nodes of the antenna to transmit the modulated data to the antenna.

6. The wireless communication medium of claim 1, wherein the analog signal processor further comprises a capacitor between a voltage output from the power supply and ground.

7. The wireless communication medium of claim 1, wherein the digital signal processor comprises:
   a clock divider which receives a clock signal, generating a clock having at least one or more frequencies, and selectively outputs a first clock and a second clock necessary for modulation;
   a transmission reception reference clock generator which generates a reception reference clock based on the first clock to sample received data and a transmission reference clock necessary for transmitting data to the external apparatus;
   a receiver which perceives an start of frame, an end of frame, and actual data from received data based on the reception reference clock, stores the start of frame, the end of frame, and actual data, and outputs the start of frame, the end of frame, and actual data;
   a transmitter which transmits a transmitter ready to the central processing unit & logic module after the end of frame is detected and a predetermined period of time elapses and converts the start of frame, the end of frame and actual data output from the central processing unit & logic module to a serial signal;
   a modulator which receives the serial signal, modulates the serial signal based on a clock received from the clock divider using a predetermined modulation method, and transmits the modulated signal to the load modulator; and
   a cyclic redundancy check generator which includes a controller that controls an error of data received and transmitted.

8. The wireless communication medium of claim 7, wherein the receiver which generates a start of frame detection signal and an end of frame detection signal corresponding to the start of frame and the end of frame, combines the start of frame detection signal and the end of frame detection signal, generates the first control signal informing that data is being received, and stops transmitting data to the external apparatus while the first control signal is activated.

9. The wireless communication medium of claim 7, wherein the transmitter perceives the end of frame detection signal, generates the second control signal that informs the ready of the transmission of data to the external apparatus after a predetermined period of time, generates a start of frame transmission signal, an end of frame transmission signal, and a data transmission signal corresponding to the start of frame, the end of frame, and actual data, outputs the start of frame transmission signal, the end of frame transmission signal, the data transmission signal to the cyclic redundancy check generator, and stops receiving data from the external apparatus while the second control signal is activated.

10. The wireless communication medium of claim 7, wherein the cyclic redundancy check generator is reset by a combination of the start of frame detection signal and the start of frame transmission signal and activated by a combination of the data detection signal, the start of frame detection signal, the end of frame detection signal, and the start of frame.

11. The wireless communication medium of claim 7, wherein the modulator samples data transmitted from the transmitter based on the second clock, compares the sampled value with data, and determines whether phase is shifted based on the compared result.

12. A method of operating a wireless communication medium, the method comprising:
   (a) converting an analog signal received from an external apparatus to a digital signal and converting a digital signal to be transmitted to the external apparatus to an analog signal;
   (b) performing modulation and demodulation for the transmission and reception of data to and from the external apparatus and generating signals for controlling the operation of the wireless communication medium based on transmitted and received data; and
   (c) processing transmitted and received data;
   wherein step (b) comprises:
   (b1) detecting a start of frame, an end of frame, and actual data from the digital signal and generating a start of frame detection signal, an end of frame detection signal, and a data detection signal corresponding the start of frame, the end of frame, and actual data, respectively;
   (b2) performing a logic operation based on the start of frame detection signal, the end of frame detection signal, and the data detection signal, and stops transmitting data to the external apparatus while data is received from the external apparatus and calculating a cyclic redundancy check value of received data, based on the result of the logic operation;
   (b3) after the end of frame is detected and a predetermined period of time elapses, generating a transmitter ready informing the ready of the transmission of data to the external apparatus, and outputting a start of frame transmission signal, an end of frame transmission signal, and a data transmission signal indicating the start of frame, the end of frame, and actual data transmitted to the external apparatus; and
   (b4) when the transmitter ready is activated, stopping receiving data from the external apparatus, calculating a cyclic redundancy check value of data transmitted to the external apparatus, and modulating the data transmitted to the external apparatus and outputting the cyclic redundancy check value.

13. The method of claim 12, wherein the signals in step (b) are generated for determining whether data is transmitted to the external apparatus, blocking reception of data from the external apparatus after a predetermined period of time, and determining whether modulated data is transmitted to the external apparatus.

* * * * *